US009171427B2

(12) United States Patent
Berman et al.

(10) Patent No.: US 9,171,427 B2
(45) Date of Patent: Oct. 27, 2015

(54) GAMING DEVICE HAVING MULTIPLE SPINS FOR WINNING OUTCOMES

(71) Applicant: KING SHOW GAMES, INC., Minnetonka, MN (US)

(72) Inventors: Bradley Berman, Minnetonka, MN (US); Chad Shapiro, Plymouth, MN (US)

( * ) Notice: Subject to any disclaimer, the term of this patent is extended or adjusted under 35 U.S.C. 154(b) by 11 days.

(21) Appl. No.: 13/975,556

(22) Filed: Aug. 26, 2013

(65) Prior Publication Data

US 2013/0344938 A1 Dec. 26, 2013

Related U.S. Application Data

(63) Continuation-in-part of application No. 12/077,719, filed on Mar. 20, 2008, now Pat. No. 8,517,813.

(60) Provisional application No. 60/919,362, filed on Mar. 22, 2007.

(51) Int. Cl.

*A63F 13/00* (2014.01)
*G07F 17/34* (2006.01)
*G07F 17/32* (2006.01)

(52) U.S. Cl.

CPC ............ *G07F 17/34* (2013.01); *G07F 17/3244* (2013.01); *G07F 17/3265* (2013.01); *G07F 17/3267* (2013.01)

(58) Field of Classification Search

CPC ........................... G07F 17/326; G07F 17/3267
USPC ................. 463/16, 20, 21, 22, 25; 273/138.1, 273/138.2
See application file for complete search history.

(56) References Cited

U.S. PATENT DOCUMENTS

| | | | | |
|---|---|---|---|---|
| 5,722,891 | A | 3/1998 | Inoue | |
| 7,090,580 | B2 | 8/2006 | Rodgers et al. | |
| 2002/0010017 | A1 | 1/2002 | Bennett | |
| 2004/0038731 | A1 * | 2/2004 | Englman | 463/25 |
| 2004/0072612 | A1 * | 4/2004 | Rodgers et al. | 463/20 |
| 2005/0070354 | A1 * | 3/2005 | Baerlocher et al. | 463/20 |
| 2006/0040728 | A1 * | 2/2006 | Fuller | 463/20 |
| 2006/0246989 | A1 | 11/2006 | Glavich et al. | |
| 2006/0247031 | A1 | 11/2006 | Walker et al. | |
| 2006/0247040 | A1 | 11/2006 | Walker et al. | |

OTHER PUBLICATIONS

King Show Games, Inc., "Listing of Related Cases", Apr. 9, 2015, 1 page.

* cited by examiner

*Primary Examiner* — James S McClellan

(57) ABSTRACT

Embodiments of the present invention set forth systems, apparatuses and methods for providing multiple spins during gaming events to provide increased opportunities to receive winning outcomes. Accordingly, a gaming device can be configured to have a plurality of reels with multiple symbols on each reel. A portion of the symbols on each reel are displayed on a game grid having a number of symbol positions. During a gaming event, the symbols are randomly arranged via a first spin on game grid to generate a first configuration and a determination is made as to whether the first condition satisfies a predetermined condition. When the predetermined condition is satisfied, the reels or symbols in the symbol positions associated with the predetermined condition are held while the remaining reels or symbol positions are subjected to a second spin to randomly generate a second configuration.

20 Claims, 11 Drawing Sheets

GAMING DEVICE HAVING MULTIPLE SPINS FOR WINNING OUTCOMES

RELATED APPLICATIONS

This application is a continuation-in-part of U.S. application Ser. No. 12/077,719, filed Mar. 20, 2008, now U.S. Pat. No. 8,517,813, which claims the benefit of Provisional Application No. 60/919,362, filed on Mar. 22, 2007, to which priority is claimed pursuant to 35 U.S.C. §119(e), both of which are incorporated herein by reference in their entirety.

FIELD OF THE INVENTION

This disclosure relates generally to games, and more particularly to systems, apparatuses and methods for providing multiple spins for winning outcomes on gaming devices.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, embodiments of the present invention are directed to an apparatus, system, computer readable storage media, and/or method that involve or otherwise facilitate multiple spins during gaming events to provide increased opportunities to receive winning outcomes. Accordingly, a gaming device can be configured to have a plurality of reels with multiple symbols on each reel. A portion of the symbols on each reel are displayed on a game grid having a number of symbol positions. During a gaming event, the symbols are randomly arranged via a first spin on game grid to generate a first configuration and a determination is made as to whether the first condition satisfies a predetermined condition. When the predetermined condition is satisfied, the reels or symbols in the symbol positions associated with the predetermined condition are held while the remaining reels or symbol positions are subjected to a second spin to randomly generate a second configuration.

BRIEF DESCRIPTION OF THE DRAWINGS

The invention is described in connection with the embodiments illustrated in the following diagrams.

DETAILED DESCRIPTION

Figure 1:
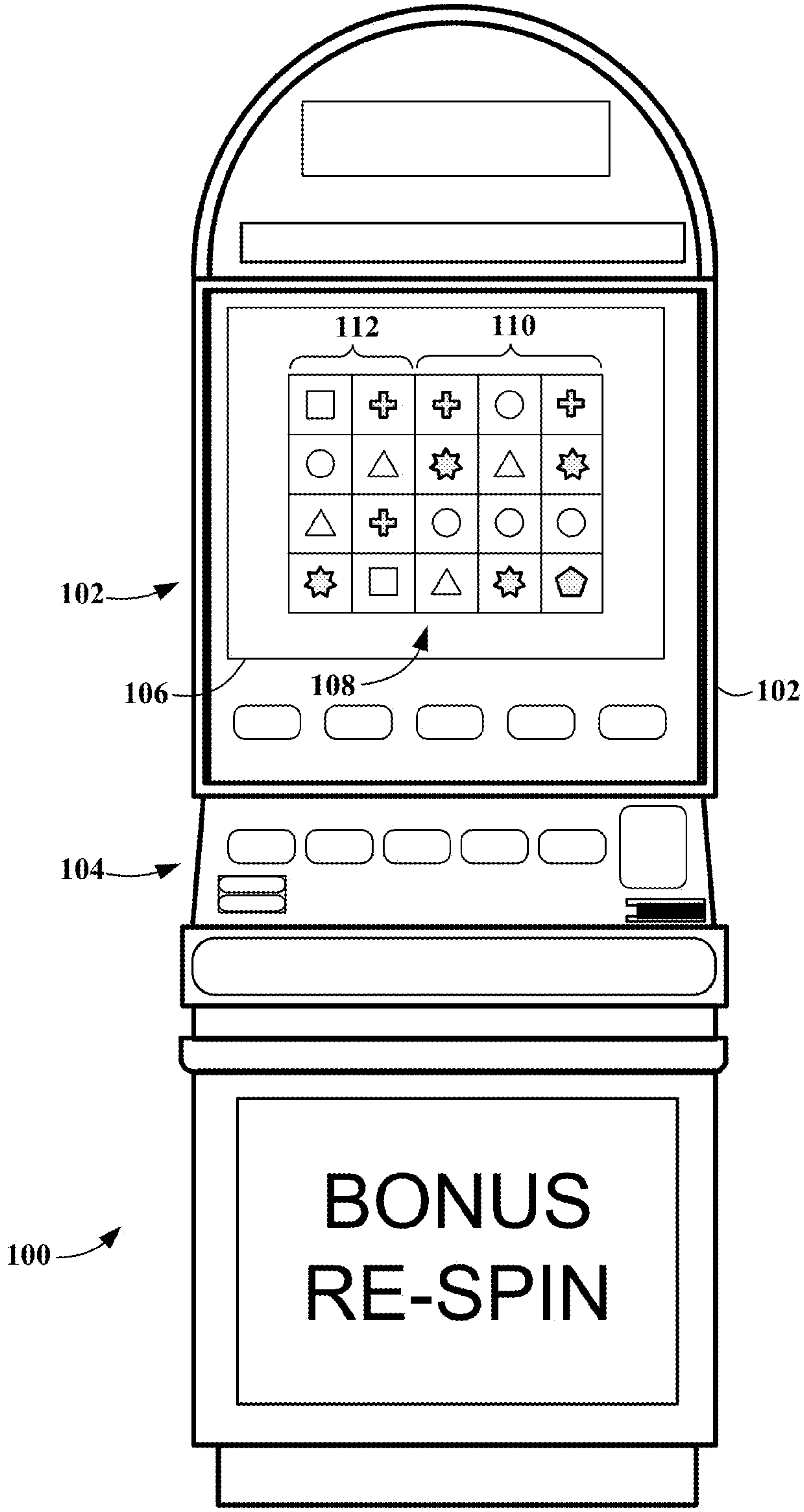
FIG. 1. is a diagram of a gaming machine according to an embodiment of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to a wagering game that may resemble a reel-type gaming apparatus such as slot machines. Generally, a reel-type apparatus provides a gaming activity that involves randomly arranging symbols in such a way as to provide a payout. A commonly implemented form of this apparatus involves using a number of side-by-side circular reels that spin on the same axis. These reels may be mechanical devices (e.g., wheels or hoops) or may be simulated via a computer and video display. The reels have symbols printed on their surface, and the player is provided a monetary award when the selected symbols form a pattern, such as when a line that spans a number of the reels has the same symbol (or satisfies some other pattern or condition).

This line that connects symbols is sometimes referred to as the pay line (or payout line), and pay lines may be horizontal, diagonal or other shapes besides a straight line.

In an apparatus according to an embodiment of the invention, after a reel-spin gaming event, winning combinations are evaluated. If a subset of the reels satisfy a condition, such as forming a winning combination or forming a particular arrangement of symbols, then the subset of the reels remain fixed while the remaining reels are automatically re-spun. The new configuration, which is based on the held subset of reels and newly spun reels, is evaluated to determining any additional winnings. This re-spin of the other reels is automatic, and is not based on a user selection. As such, this feature not does it involve the use of skill on the part of the player.

In the description that follows, the term "reels," "reel strips," and similar mechanically descriptive language may be used to describe various apparatus presentation features. Although the present disclosure may be applicable to both to mechanical and computerized embodiments, and any combination therebetween, the use of mechanically descriptive terms is not meant to be only applicable to mechanical embodiments. Those skilled in the art will understand that, for purposes of providing gaming experiences to players, mechanical elements such as reels may be simulated on a display in order to provide a familiar and satisfying experience that emulates the behavior of mechanical objects. Further, the computerized version may provide the look of a reel (e.g., a linear arrangement of symbols) and inter-reel elements but are randomized in a way different than a spinning reel, such as by randomly and independently changing each cell of the reel that has a symbol. Thus, the term "reels," "reel strips," etc. are intended to describe both physical objects and emulation or simulations of those objects using electronic apparatus.

In various embodiments of the invention, the gaming displays are described in conjunction with the use of data in the form of "symbols." In the context of this disclosure, a "symbol" refers to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures.

In reference now to FIG. 1, a gaming machine 100 is illustrated that provides a gaming experience according to an embodiment of the invention. The illustrated gaming machine 100 may include a computing system (not shown) to carry out operations according described herein. The gaming machine 100 includes a display 102, and a user interface 104, although some or all of the user interface 104 may be provided via the display 102 in touch screen embodiments. The user interface 104 allows the user to control and engage in play of the gaming machine 100. The particular user interface mechanisms included with user interface 104 may be dependent on the type of gaming machine. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the user can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and fixed display information such as information such as paytable information associated with a glass/plastic panel on the gaming machine 100. The symbols or other indicia associated with the play of the game may be presented on an electronic display device. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

Figure 2:
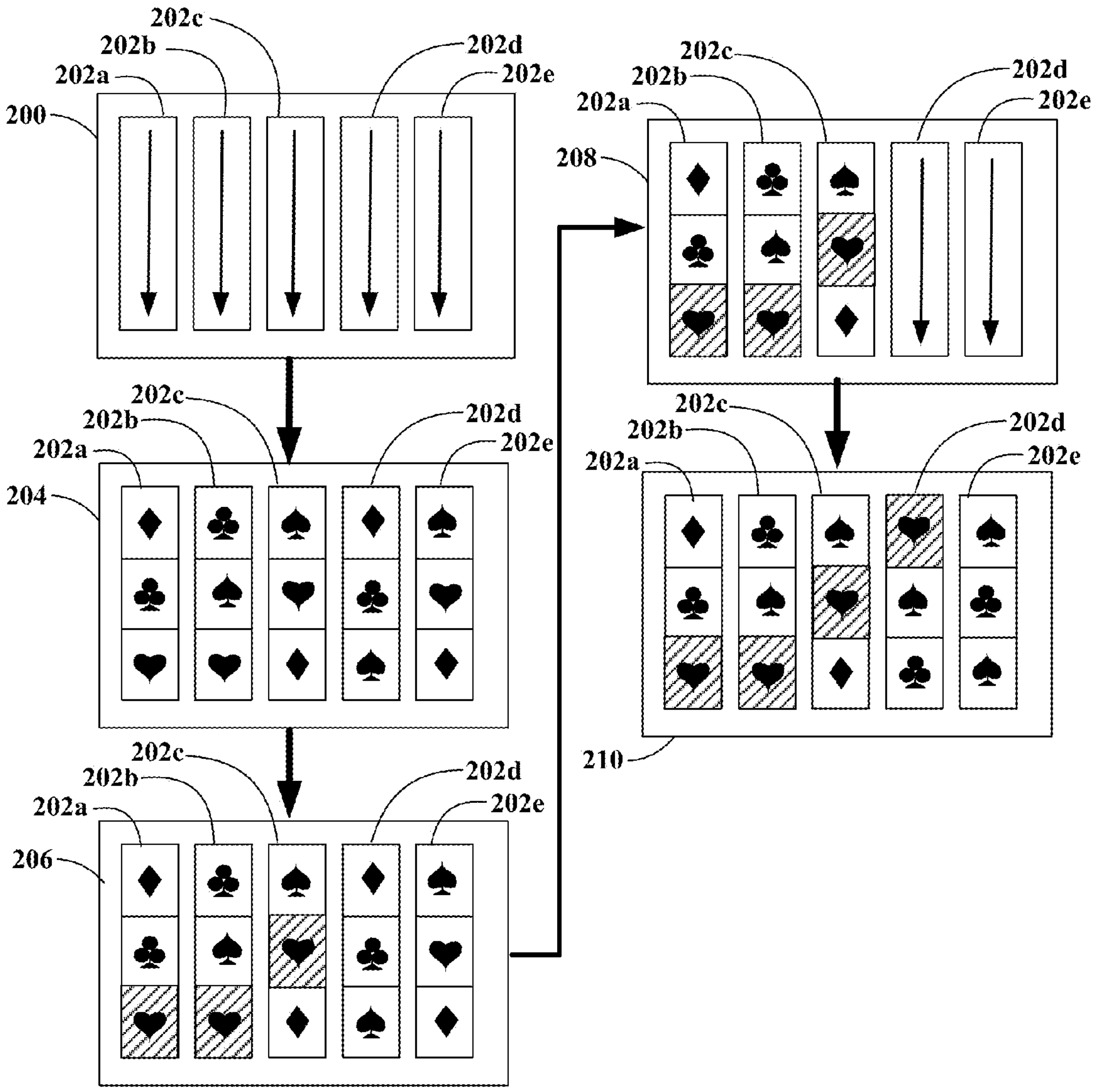
FIG. 2 is a sequence diagram showing a sequence of gaming screens in a gaming apparatus according to an embodiment of the invention.

In the illustrated embodiment, the gaming portion 106 displays a set of primary reels 108. The reels 108 each include symbols that may be animated so that the symbols appear to be on the surface of a wheel that is rotating vertically when game play is initiated. As is known in the art, when the symbols of the reels stop moving (typically after a random amount of time when physical reel devices are involved), the player may be provided a monetary award if some set of symbols on adjacent reels 108 satisfy some criteria. In addition, some subset of the reels, e.g., subset 110, may be selected based on this win criteria, such as the row of three matching circles seen in subset 110. The other reels not in the subset, e.g., subset 112, are spun again automatically for an additional turn. The configuration of the both subsets of reels 110, 112 after the re-spin determines a secondary payout The sequence diagram of FIG. 2 shows an example of how a reel-type game that includes automatic, selective re-spins may proceed according to an embodiment of the invention. Screen 200 shows reels 202_a-e_ being randomized by spinning, as indicated by the vertical arrows. The screen 200 is typically seen after the player has made a wager and initiated play, such as by pulling a lever or pushing a button. The randomization of the symbols associated with the reels 202_a-e_ may be accomplished in other ways besides using vertically spinning reels, such as by independently randomizing cells within each of the reels 202_a-e_. The spinning of the reels 202_a-e_ seen in screen 200 may be in response to a primary gaming event, a bonus event, or some other play event or feature.

In screen 204, the randomization of reels 202_a-e_ is complete, and wins may be evaluated at this time. The evaluation of wins is shown in screen 206, which shows shaded cells that correspond to a payline or winning sequence. The indicated win involves a subset of the reels 202_a-e_, in particular reels 202_a-c_. A sequence of symbols formed by reels 202_a-c_ matches a predetermined criteria (e.g., three neighboring cells having a high symbol) and therefore reels 202_d-e_ are re-spun, as is shown in screen 208. Screen 210 shows an additional win evaluation that occurs after reels 202*d-e* have stopped spinning. As can be seen by the additional highlighted cell in reel 202*d*, an additional match has occurred, and additional payout is provided based on this match.

The re-spinning of some of the reels may occur only based on certain conditions occurring with the other reels. For example, the re-spin may only occur if the matching of the other reels involves high symbols, wild symbols, or other special symbols. The re-spin may be activated by the player placing a side bet before the initial spin, and this could be allowed instead of or in addition to special symbols that trigger a re-spin. In some cases, special symbols or side bets may be able to activate more than one re-spin. In the example of FIG. 2, if the player had paid to activate three re-spins, if needed, then reels 202*d-e* would be re-spun and wins re-evaluated two more times similar to what is shown in screens 208, 210.

Another example of how multiple re-spins may be applied may be demonstrated by referring again to screen 210 of FIG. 2. This screen 210 resulted from a re-spin, and as described above, triggered an additional winning event due to the matching symbol appearing in reel 202*d* with symbols of reels 202*a-c*. If the player has paid for more than one re-spin in such a case, the re-spin may be applied only to the remaining reel 202*e*, instead of to both 202*d* and 202*e*. Thus, if the player has wagered a side bet for three additional spins, reel 202*e* may be re-spun two more time in an attempt to get yet another win, e.g., a sequence of five matching symbols. Even where the side bet only activates a single re-spin (or where no side bet is required), the game may automatically spin additional reels (e.g., reel 202*e*) if a reel that was re-spun once (e.g., reel 202*d*) results in an additional winning event.

In another variation, instead of re-spinning reels 202*e-f*, only the symbols that are next in sequence on the pay line for which a pay could be made would spun. For example, if the paylines are limited to horizontal lines, and the initial win included three symbols along the bottom row of a first set of reels, only the symbols of the remaining reels along the bottom row will be re-spun. This latter example may be implemented in reel type games where individual cells can be randomized independent of other cells on the same reel.

Figure 3:
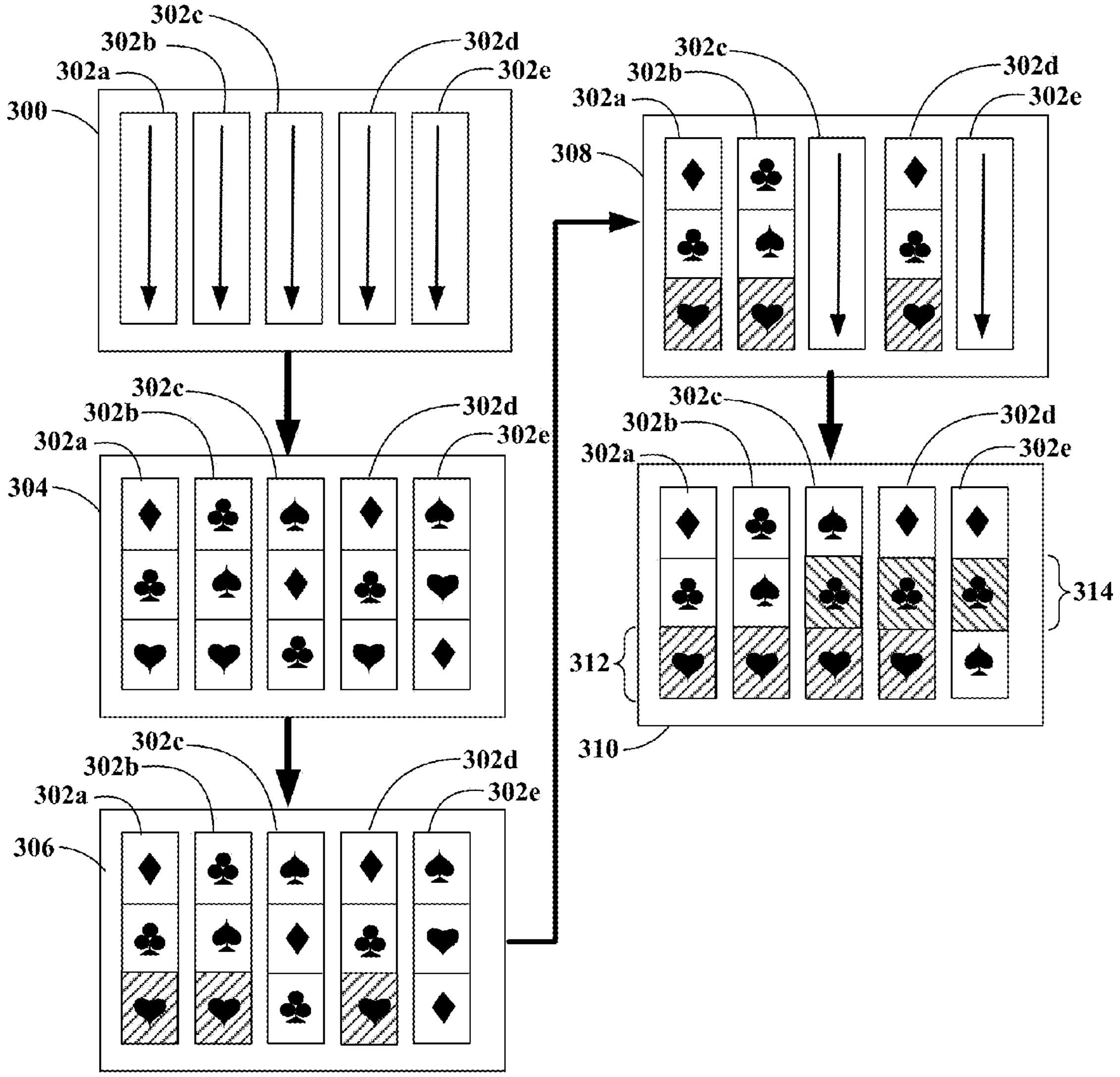
FIG. 3 is a sequence diagram showing an alternate sequence of gaming screens in a gaming apparatus according to an embodiment of the invention.

It will be appreciated that a re-spin may be automatically awarded even when the first spin did not result in a win. One example of this according to an embodiment of the invention is shown in FIG. 3. Screen 300 shows reels 302*a-e* being randomized by spinning, as indicated by the vertical arrows. In screen 304, the randomization of reels 302*a-e* is complete, and in this case, the reels 302*a-e* may not form a winning combination. However, as is indicated by shaded cells in screen 306, three matching symbols lie on a payline, although not in sequences. If the re-spin feature is activated and can be triggered by such an event, the reels 302*a*, 302*b*, and 302*d* are held, and reels 302*c* and 302*e* are re-spun, as is shown in screen 308.

Screen 310 shows the win evaluation that occurs after reels 302*c* and 302*e* have stopped spinning. As can be seen by the shaded row 312, the re-spinning has cause a four-in-a-row match, and a payout is provided based on this match. As is also seen in screen 310, a three-in-a-row match has also occurred as indicated in row 314. This latter sequence 314 may or may not be included in the payout. This could depend on the rules of the particular game, or could be dependent on particular wagers.

Figure 4:
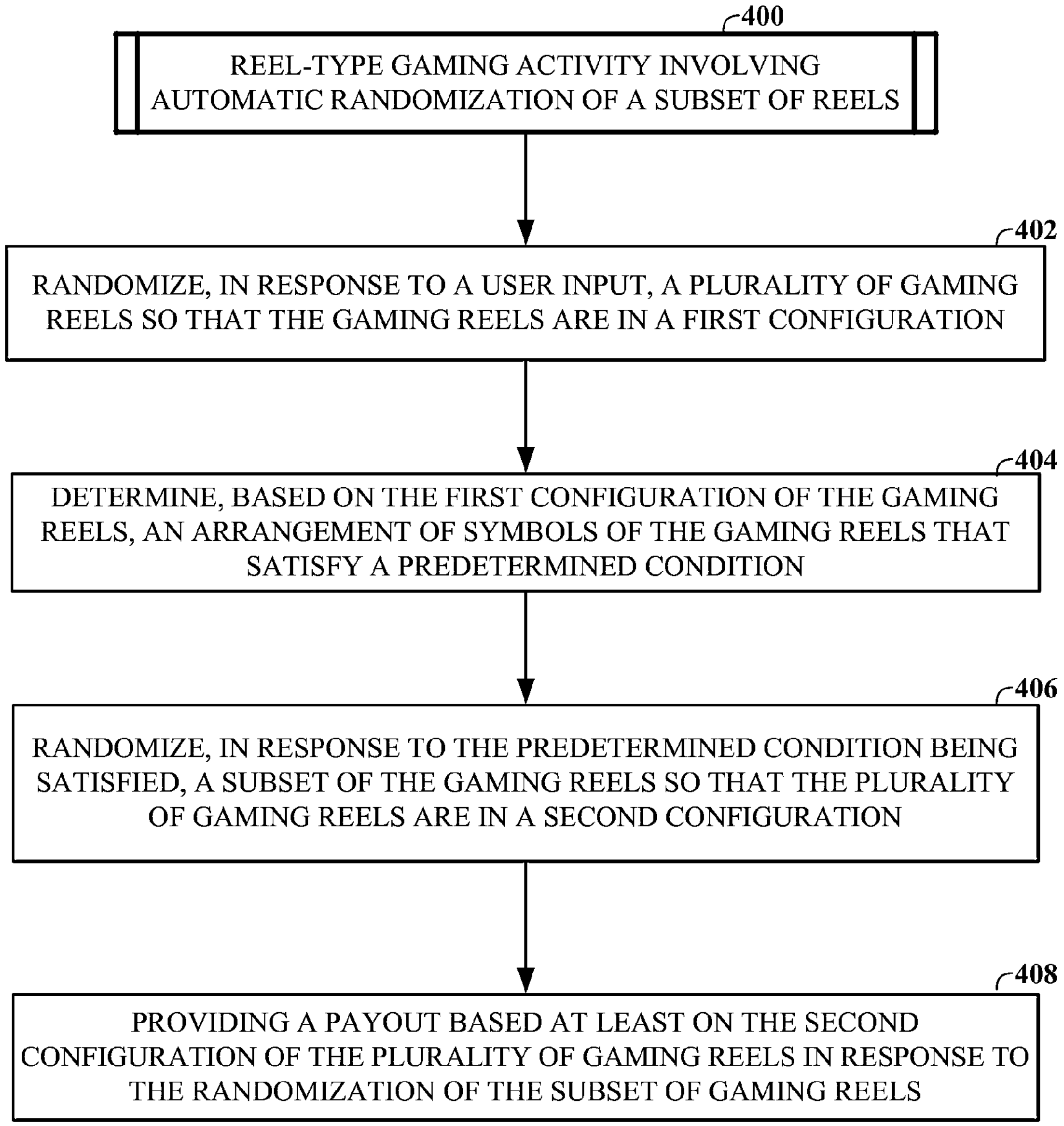
FIG. 4 is a flowchart illustrating a gaming procedure according to an embodiment of the invention.

In reference now to FIG. 4, an example procedure 400 is illustrated for providing a gaming experience according to embodiments of the invention. In response to a user input, a plurality of gaming reels is randomized 402 so that the gaming reels are in a first configuration. Based on the first configuration of the gaming reels, it is determined 404 whether an arrangement of symbols of the gaming reels satisfy a predetermined condition. In response to the predetermined condition being satisfied, a subset of the gaming reels is randomized 406 so that the plurality of gaming reels are in a second configuration. The subset of gaming reels is randomized 406 independently of additional user inputs occurring after the determination of the predetermined condition. The gaming reels not in the subset of reels are held while the subset of gaming reels is randomized A payout is provided 408 based at least on the second configuration of the plurality of gaming reels in response to the randomization of the subset of gaming reels.

Figure 5:
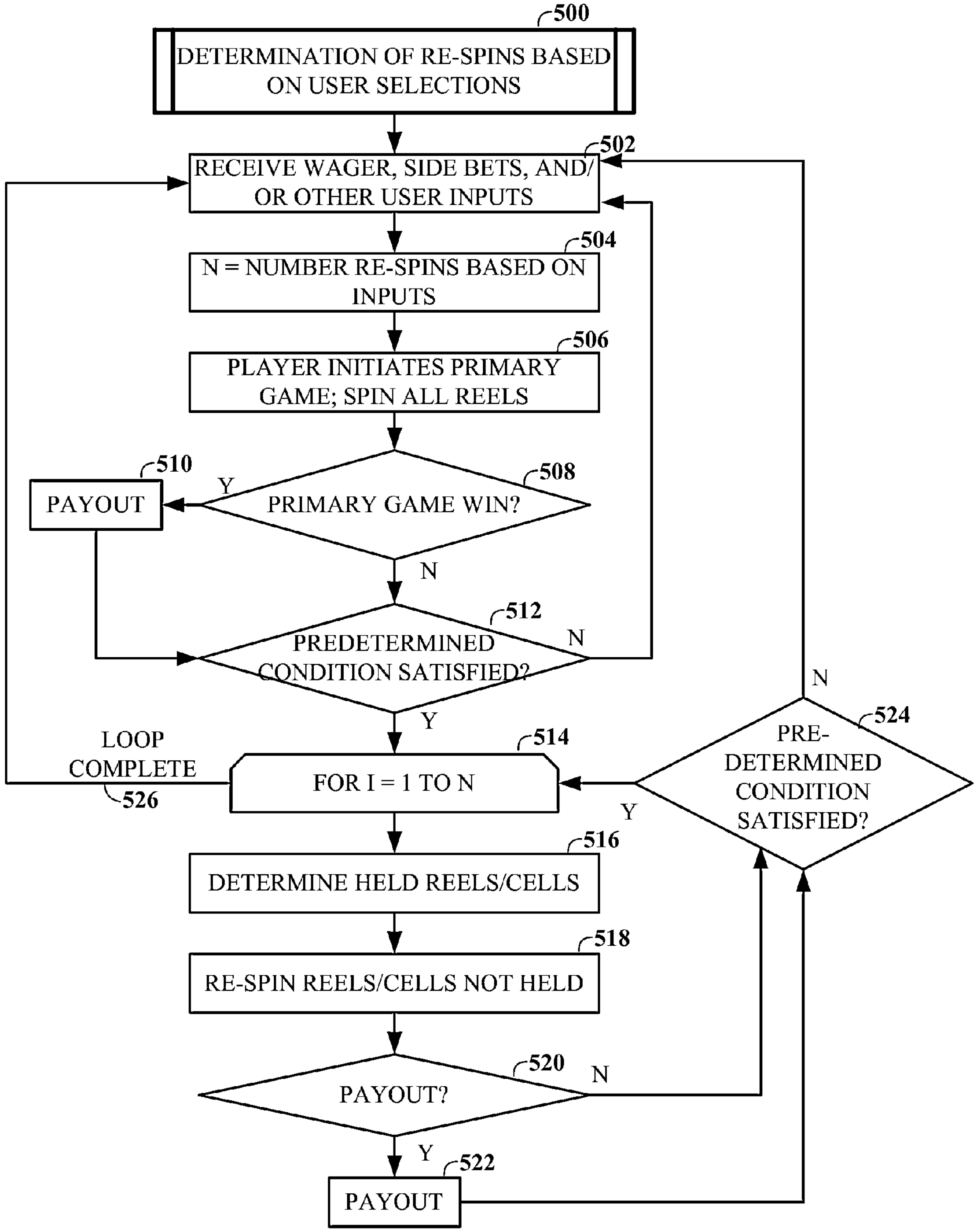
FIG. 5 is a flowchart illustrating a procedure for determining re-spins according to an embodiment of the invention.

As discussed hereinabove, the triggering of selected reel re-spins may be conditioned on a user action taken before the full set of reels is activated. This user action may be a side wager or other selection, and may include the ability to trigger more than one re-spin. In reference now to FIG. 5, a procedure 500 illustrates how user inputs before game play is initiated may affect re-spins according to an embodiment of the invention. A player will provide input 502 such as wagers, side bets, etc., that may or may not enable the re-spinning of selected reels. Based on this input, 502, a variable N is determined 504 based on the wager. In some variations, N may be a constant (e.g., set to one) or may be a function of the wager amount.

The player initiates game play 506 and all reels are spun or otherwise randomized. A determination 508 is made if this spin results in a payout, in which case the payout 510 may be provided or otherwise indicated to the player. In either event, a test 512 is made for the existence of a predetermined condition, typically based on arrangement of the reels. In some embodiments, a primary game win 508 may be part of the condition, so that if determination 508 is no, then determination 512 is also always no. In other arrangements, even a non-winning arrangement may still satisfy the condition, e.g., the showing of special symbols in reels and/or other predetermined patterns.

If the predetermined condition 512 is satisfied, then a loop 514 is entered, and may be re-entered multiple times depending on the value of N previously determined 540 as well as other conditions. The loop 514 involves determining 516 which reels are to be held and which are to be re-spun 518. Note that in some game embodiments, individual cells may be randomized instead of re-randomizing a whole reel. After the re-spinning 518, a payout is determined 520 and payout 522 may be provided.

In some variations, the loop 514 may test 524 for the existence of the predetermined condition before continuing. For example, additional re-spins may be dependent on previous re-spins resulting in additional wins 522. If the condition 524 is not satisfied, or the loop is complete, as indicated by path 526, the procedure resumes its initial input condition 502. Note that if N=0, (e.g., player made no side wager), then the loop 514 may terminate 526 even if the predetermined condition 512 is satisfied.

Figure 6:
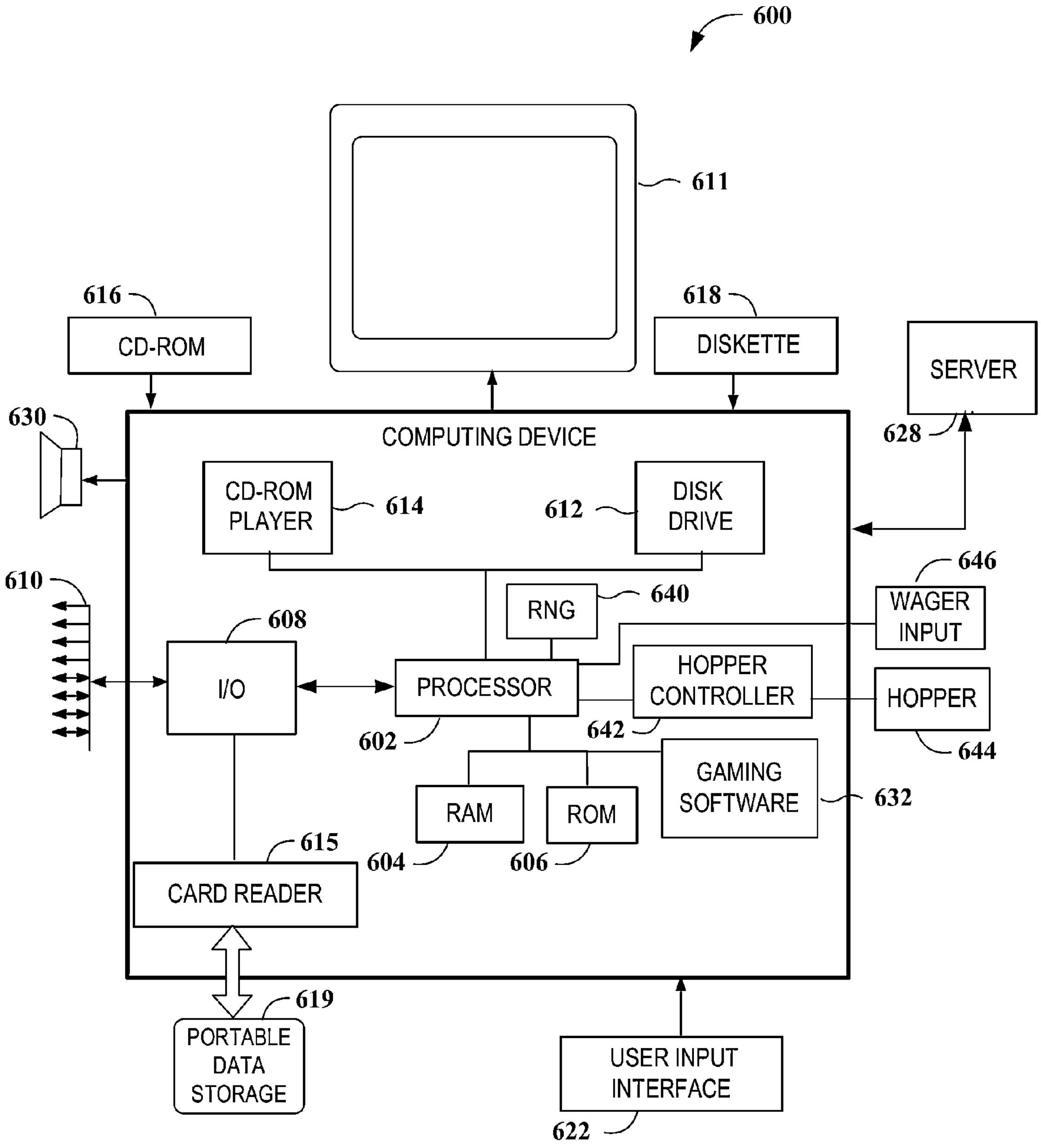
FIG. 6 is a block diagram illustrating a computing arrangement according to an embodiment of the invention.

As may now be readily understood, one or more devices may be programmed to play various embodiments of the invention. The present invention may be implemented as a casino gaming machine such as a slot machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 6.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 600 of FIG. 6 is an example computing structure that can be used in connection with such electronic gaming machines, computers, or other computer-implemented devices to carry out operations of the present invention.

The example computing arrangement 600 suitable for performing the gaming functions in accordance with the present invention typically includes a central processor (CPU) 602 coupled to random access memory (RAM) 604 and some variation of read-only memory (ROM) 606. The ROM 606 may also represent other types of storage media to store programs, such as programmable ROM (PROM), erasable PROM (EPROM), etc. The processor 602 may communicate with other internal and external components through input/output (I/O) circuitry 608 and bussing 610, to provide control signals, communication signals, and the like.

The computing arrangement 600 may also include one or more data storage devices, including hard and floppy disk drives 612, CD-ROM drives 614, card reader 615, and other hardware capable of reading and/or storing information such as DVD, etc. In one embodiment, software for carrying out the operations in accordance with the present invention may be stored and distributed on a CD-ROM 616, diskette 618, access card 619, or other form of media capable of portably storing information. These storage media may be inserted into, and read by, devices such as the CD-ROM drive 614, the disk drive 612, card reader 615, etc. The software may also be transmitted to the computing arrangement 600 via data signals, such as being downloaded electronically via a network, such as the Internet. Further, as previously described, the software for carrying out the functions associated with the present invention may alternatively be stored in internal memory/storage of the computing device 600, such as in the ROM 606.

The computing arrangement 600 is coupled to the display 611, which represents a display on which the gaming activities in accordance with the invention are presented. The display 611 represents the "presentation" of the video information in accordance with the invention, and may be any type of known display or presentation screen, such as LCD displays, plasma display, cathode ray tubes (CRT), digital light processing (DLP), liquid crystal on silicon (LCOS), etc. Where the computing device 600 represents a stand-alone or networked computer, the display 611 may represent a standard computer terminal or display capable of displaying multiple windows, frames, etc. Where the computing device is embedded within an electronic gaming machine, the display 611 corresponds to the display screen of the gaming machine/kiosk. A user input interface 622 such as a mouse, keyboard/keypad, microphone, touch pad, trackball, joystick, touch screen, voice-recognition system, etc. may be provided. The display 611 may also act as a user input device, e.g., where the display 611 is a touchscreen device.

Chance-based gaming systems such as slot machines, in which the present invention is applicable, are governed by random numbers and processors, as facilitated by a random number generator (RNG). In particular, the fixed and dynamic symbols generated as part of a gaming activity may be produced using one or more RNGs. RNGs are known in the art, and may be implemented using hardware, software operable in connection with the processor 602, or some combination of hardware and software. The present invention is operable using any known RNG, and may be integrally programmed as part of the processor 602 operation, or alternatively may be a separate RNG controller 640.

The computing arrangement 600 may be connected to other computing devices or gaming machines, such as via a network. The computing arrangement 600 may be connected to a network server 628 in an intranet or local network configuration. The computer may further be part of a larger network configuration as in a global area network (GAN) such as the Internet. In such a case, the computer may have access to one or more web servers via the Internet.

Other components directed to gaming machine implementations include manners of gaming participant payment, and gaming machine payout. For example, a gaming machine including the computing arrangement 600 may also include a hopper controller 642 to determine the amount of payout to be provided to the participant. The hopper controller may be integrally implemented with the processor 602, or alternatively as a separate hopper controller 642. A hopper 644 may also be provided in gaming machine embodiments, where the hopper serves as the mechanism holding the coins/tokens of the machine. The wager input module 646 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 632 may be able to control payouts via the hopper 644 and controller 642 for independently determined payout events.

Among other functions, the computing arrangement 600 provides an interactive experience to players via input interface 622 and output devices, such as the display 611, speaker 630, etc. These experiences are generally controlled by gaming software 632 that controls a primary gaming activity of the computing arrangement 600. The gaming software 632 may be temporarily loaded into RAM 604, and may be stored locally using any combination of ROM 606, drives 612, or media player 614. The primary gaming software 632 may also be accessed remotely, such as via the server 628 or the Internet.

The primary gaming software 632 in the computing arrangement 600 according to embodiments of the present invention provides a floating reel-type gaming experience as defined hereinabove. For example, the software 632 may present, by way of the display 611, a plurality of gaming reels each having a plurality of symbols that are randomly arranged in response to gaming events. The software 632 controls the reels by randomizing, in response to a user input, the reels so that the gaming reels are in a first configuration. Based on the first configuration of the gaming reels, the software 632 determines an arrangement of the symbols that satisfy a predetermined condition. In response to the predetermined condition being satisfied, the software 632 randomizes a subset of the gaming reels so that the plurality of gaming reels are in a second configuration. The software 632 causes payout devices 642, 644 to provide a payout based at least on the second configuration of the plurality of gaming reels in response to the randomization of the subset of gaming reels.

Figure 7:
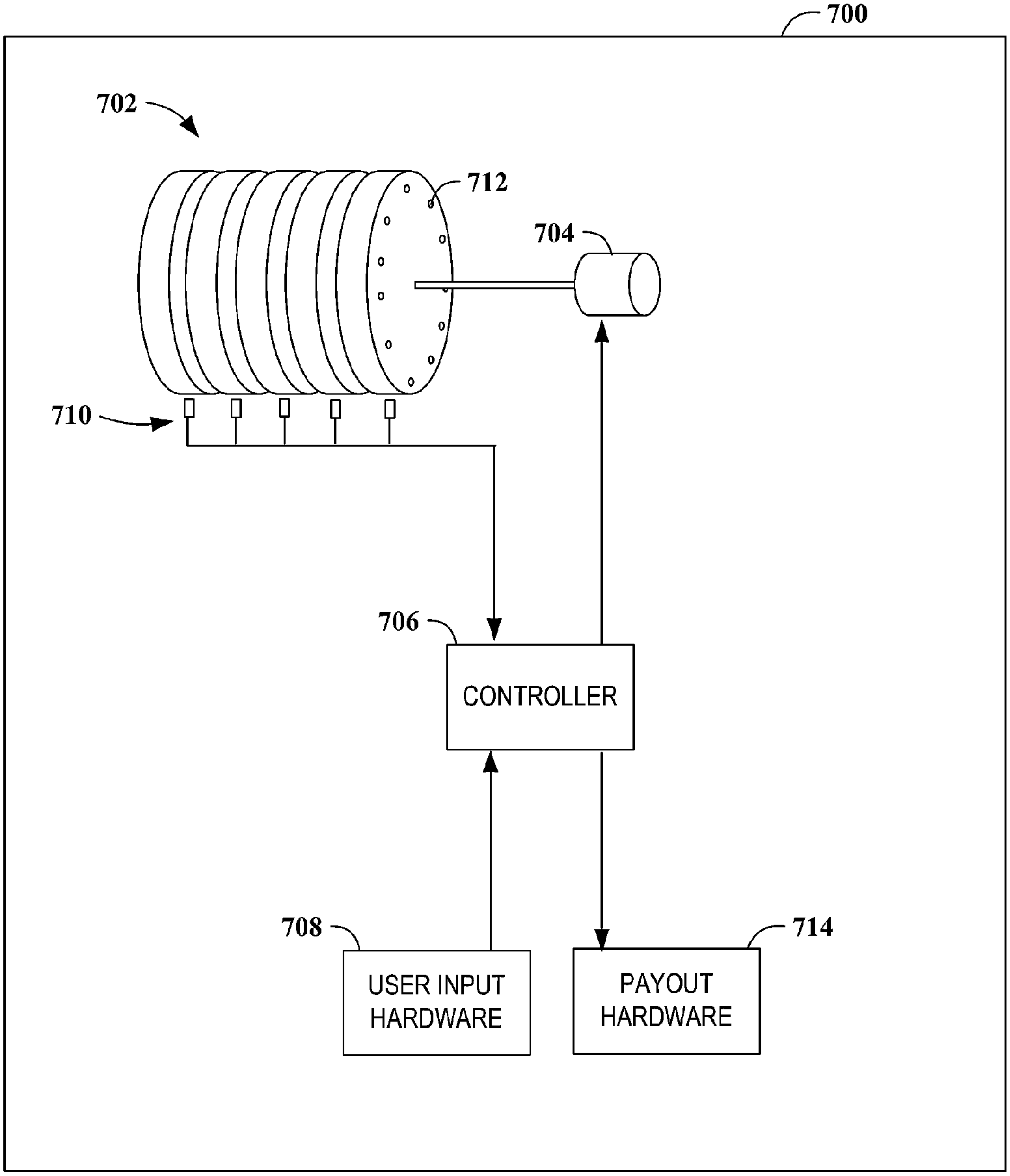
FIG. 7 is a block diagram illustrating an electro-mechanical apparatus according to an embodiment of the invention.

It will be appreciated that the above functionality described in relation to a computer implemented gaming apparatus may also be applied to electromechanical apparatus as well. In reference now to FIG. 7, an apparatus 700 according to an embodiment of the invention is illustrated. The apparatus includes mechanical reels 702 that generally have symbols printed on an outer surface. The reels 702 are controlled by one or more motors 704, which receive commands from a controller 706. The motor 704 may be rotary or linear (e.g., solenoid and/or linear stator device). The motor 704 may cause the reels 702 to turn, or a mechanical device such as a lever (not shown) may cause the reels to turn in response to user activation. In the latter case, the motor 704 may cause the reels 702 to randomly stop, such as by applying a braking force to a hub or shaft.

The controller 706 may be include digital and/or analog circuitry that implements the logic and control functions of the apparatus. The controller 706 receives user inputs via input hardware 708, and in response may cause the motor 704 to randomize all of the reels 702 into a first configuration. The controller may be coupled to sensors 710 that detect reel positions, such as by optical, magnetic, or other markers located on the reels 702, as illustrated by marker 712. Based on the first configuration, the controller 706 may cause a payout to be provided by way of payout hardware 714. Additionally, the controller determines an arrangement of the reels 702 that satisfies a predetermined condition. In response to the predetermined condition being satisfied, the controller 706 randomizes a subset of the reels 702 so that the reels 702 are in a second configuration. The controller 706 causes payout hardware 714 to provide a payout based at least on the second configuration of the reels 702 in response to the randomization of the subset of reels.

Figure 8:
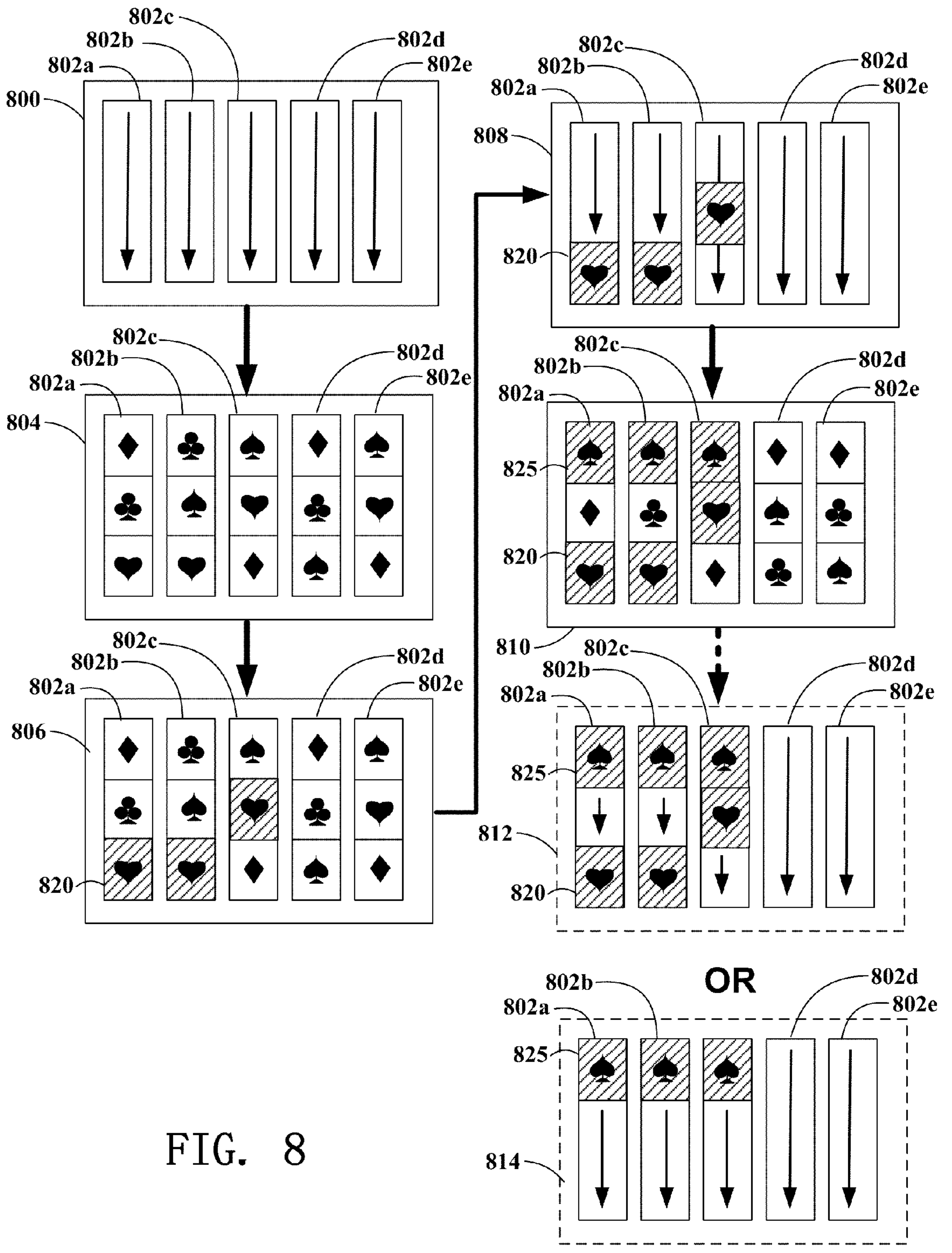
FIG. 8 is a sequence diagram showing a sequence of gaming screens in a gaming apparatus according to an embodiment of the invention.

FIG. 8 is a sequence diagram showing a sequence of gaming screens in a gaming apparatus according to an embodiment of the invention. Referring to FIG. 8, gaming display or screen 800 shows reels 802*a-e* being randomized by spinning the reels, as indicated by the vertical arrows. The screen 800 is typically seen after the player has made a wager and initiated play, such as by pulling a lever or pushing a button. The randomization of the symbols associated with the reels 802*a-e* may be accomplished in other ways besides using vertically spinning reels, such as by independently randomizing cells within each of the reels 802*a-e*. The spinning of the reels 802*a-e* seen in screen 800 may be in response to a primary gaming event, a bonus event, or some other play event or feature.

In screen 804, the randomization of reels 802*a-e* is complete, and wins may be evaluated at this time. The evaluation of wins is shown in screen 806, which shows shaded symbol positions or cells 820 that correspond to a payline or winning sequence. The indicated win involves a subset of the symbol positions on the game grid reels 802*a-e*, in particular symbol positions 820. A sequence of symbols formed by symbol positions 820 matches a predetermined criteria (e.g., three neighboring symbol positions having a high symbol) and therefore the symbols at the winning symbol positions 820 are held or have their position maintained while reels 802*a-e* are re-spun, as is shown in screen 808. In some embodiments, the held symbol positions 820 are shown above the spinning reels (802*a-c* in this instance). Here, symbols from the game reels that would have typically landed in the held symbol positions 820 can be hidden and replaced by the symbols at the held symbol positions, or these symbols can be displaced upward (effectively nudging the reels back a symbol) or downward. In alternate embodiments, where each symbol position is associated with an independent reel, the reels associated with the held symbol positions 820 may not be spun or activated.

Screen 810 shows an additional win evaluation that occurs after reels 802*a-e* have stopped spinning. As can be seen by the additional highlighted symbol positions 825 on the game grid, an additional match has occurred, and an additional payout is provided based on this match. In some embodiments, the award for the first winning combination at the held symbol positions 820 is repaid again, as well. That is, all displayed winning combinations are paid with each game outcome. In other embodiments, only newly formed winning symbol combinations generate awards for the player.

The re-spinning of the reels 802*a-e* may occur only based on certain conditions occurring after an initial spin. For example, the re-spin may only occur if the winning condition on the reels 802*a-e* involves high symbols, wild symbols, or other special symbols. The re-spin may be activated by the player placing a side bet before the initial spin, and this could be allowed instead of or in addition to special symbols that trigger a re-spin. In some cases, special symbols or side bets may be able to activate more than one re-spin. These re-spins may continue as long as a predefined condition is met. For example, re-spins may occur as long as a previous spin has resulted in a new winning symbol combination, or a new winning symbol combination with an award value higher than award values associated with previously received (and held) symbol combinations. In the example of FIG. 8, optional screens 812 and 814 show two different embodiments of re-spin variations.

In the embodiment shown in screen 812, the three spade symbols associated with symbol positions 825 and held along with the three heart symbols in the originally held symbol positions 820 while the reels 802*a-e* are re-spun. Alternatively, as shown in screen 814, only the latest symbol positions 825 associated with a winning condition may be held while the reels 802*a-e* are re-spun. As previously mentioned, re-spins may only be triggered if a new symbol combination is associated with a larger award than the awards associated with previously held symbol combinations. If this condition was configured in the gaming device for the screens 812 and 814, then the three spade symbols in symbol positions 825 would have to be associated with a larger award than the three heart symbols in symbol positions 820 for the re-spin to occur.

Another example of how multiple re-spins may be applied may be demonstrated by referring again to screen 810 of FIG. 8. In this example, the player must pre-pay for the ability to re-spin the reels 802*a-e*. Screen 810 resulted from a re-spin, and as described above, triggered an additional winning event due to the matching symbol appearing in symbol positions 825. If the player has paid for more than one re-spin in such a case, the re-spin may be applied only to the remaining symbol positions not in either winning combination as shown in screen 812. Alternatively, only symbol positions related to a latest or highest paying symbol combination may be held as shown in screen 814. Thus, if the player has wagered a side bet for three additional spins, the game reels 802*a-e* may be re-spun two more time in an attempt to get yet another win. Even where the side bet only activates a single re-spin, the game may automatically spin the reels 802*a-e* if another winning condition has been satisfied as described above.

In another variation, instead of re-spinning reels 802*a-e*, only the symbol positions that are next in sequence on the pay line associated with a symbol positions 820 associated with a winning condition. for which a pay could be made would spun. For example, if the paylines are limited to horizontal lines, and the initial win included three symbols along the bottom row of a first set of reels, only the symbol positions of the remaining reels along the bottom row will be re-spun. This latter example may be implemented in reel type games where individual cells can be randomized independent of other cells on the same reel.

Figure 9:
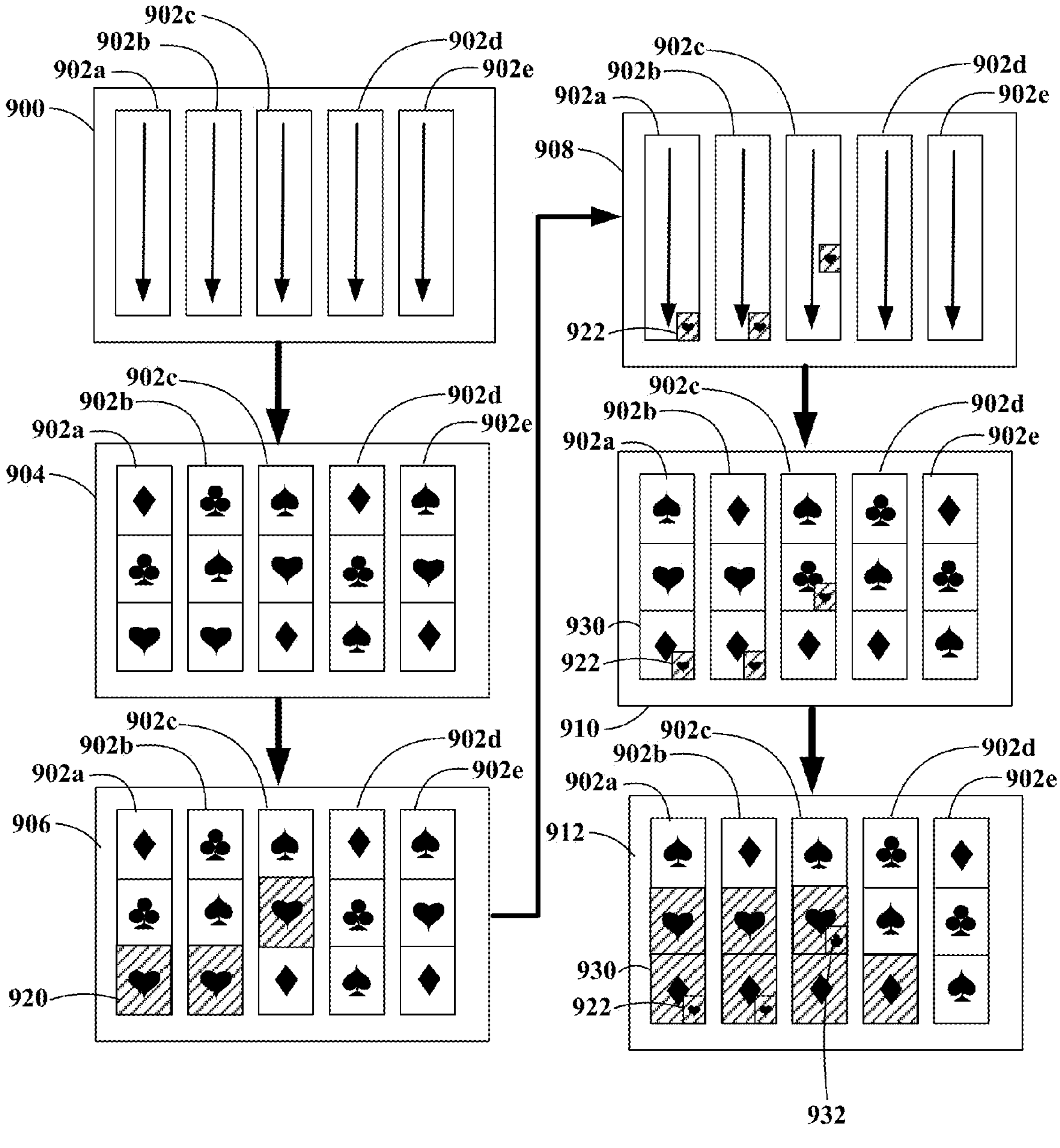
FIG. 9 is a sequence diagram showing an alternate sequence of gaming screens in a gaming apparatus according to an embodiment of the invention.
Figure 10:
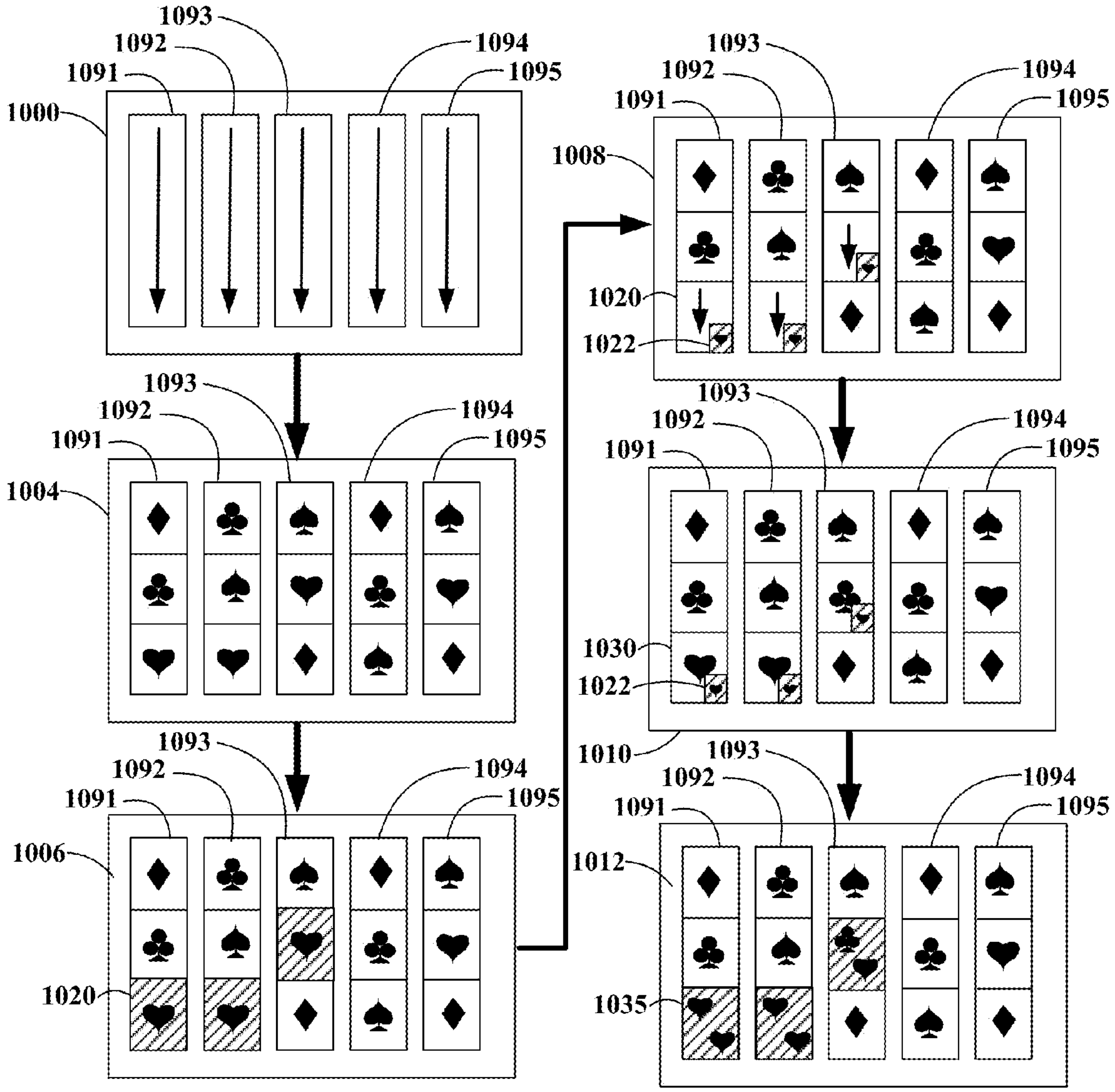
FIG. 10 is a sequence diagram showing another alternate sequence of gaming screens in a gaming apparatus according to an embodiment of the invention.
Figure 11:
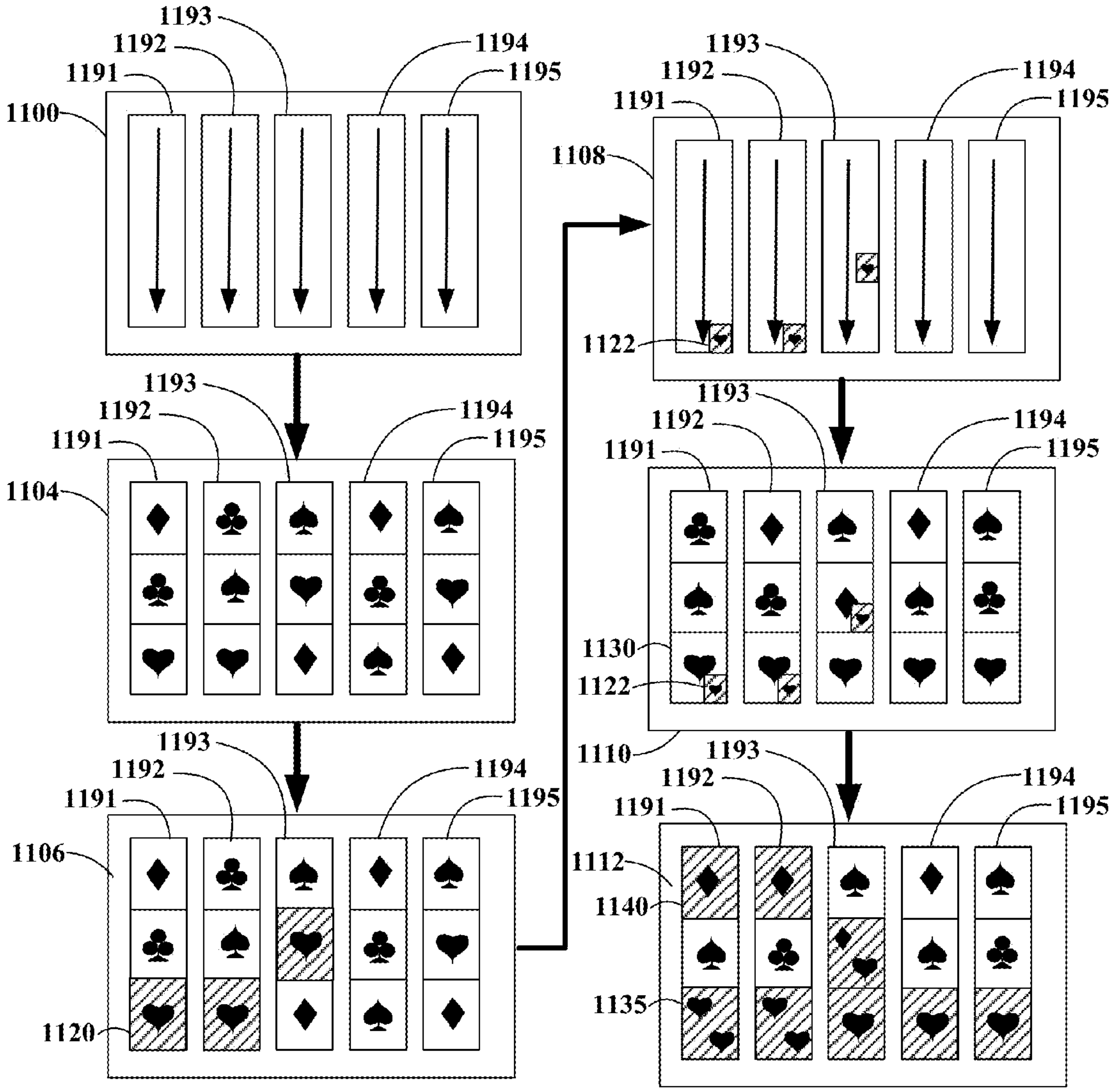
FIG. 11 is a sequence diagram showing another alternate sequence of gaming screens in a gaming apparatus according to an embodiment of the invention.

FIGS. 9-11 include additional embodiments that are shown in sequences of gaming screens in a gaming apparatus. Any of these embodiments can be modified using the variations discussed above. However, a further description of these variations with these embodiments is not included so as not to obscure the features of these different embodiments.

Referring to FIG. 9, a game sequence is shown for embodiments where symbols associated a winning combination as a result of a first spin are marked or otherwise associated with their initial symbol position while the game reels are re-spun. Here, new symbols are received in the symbol positions of the held or marked symbols, providing for a variety of symbol evaluation options. In particular, game reels 902*a-e* are spun in screen 900 during a first gaming event, which results in a first game outcome shown in screen 904 when the reels come to rest. This first game outcome is evaluated for a winning condition (or other triggering event that generates a re-spinning of the reels 902*a-e*) in screen 906. Here, the symbol positions 920 are shaded or otherwise indicated to show a winning symbol combination.

As shown in screen 908, the symbols associated with this winning condition are marked or otherwise associated with their winning symbol positions 920 as markings 922 while the game reels 902*a-e* are re-spun. In some embodiments, the markings 922 may include shrinking the symbol image to a portion of the symbol position 920 and spinning the reels 902*a-e*. In other embodiments, the markings 922 may be configured in other ways to associate the symbol images with the corresponding symbol positions 920 while the reels 902*a-e* are spinning. As shown in screen 910, the game reels 902*a-e* have come to a rest to display a second game outcome. Here, new symbols 930 have been positioned in the previous symbol positions 920 that were associated with the winning condition in the first game outcome.

The second outcome is then evaluated for winning conditions. Here, the new symbols 930 or the markings 922 of the previous symbols used in the winning condition of the first game outcome may be used in evaluating the second game outcome. In some embodiments, symbol combinations using either the new symbols 930 or symbols in the markings 922 are determined. That is each permutation or combination of symbols from the new symbols 930 and marking 922 is considered and evaluated. In some embodiments, an optimal combination is determined for one of the new symbols 930 or corresponding marking 922 to appear as the symbol in the associated symbol position. For example, as shown in screen 912, the diamond symbols in the new symbols 930 have been maintained in the two lower symbol positions on reels 902*a* and 902*b* since a four diamond payline can be created on a horizontal payline on the bottom row. However, the middle symbol position in the third reel 902*c* has switched symbols so that the previous marking 922 (the heart) becomes the symbol for final evaluation while the previous new symbol 930 (the club) becomes a new marking 932, so that a three heart symbol combination along a horizontal middle payline can be formed. Here, only the final symbols and not the markings (after the determination if the symbols and markings should be interchanged) are used in the final evaluation of the game reels 902*a-e* to determine symbol combinations associated with awards and/or winning conditions that may trigger additional re-spins.

In other embodiments, the determination of the whether to use the new symbols 930 or the markings 922 in symbol combination evaluations for awards is done on a payline-by-payline basis. Thus, in a final evaluation the symbol shown in the a symbol position having a new symbol 930 and a marking 922 may alternate between the new symbol and the symbol associated with the marking 922 depending on which payline result is being shown. This results in an optimal payout result for each played payline.

Additional variations may also be possible, such as implementing rules as to when markings can be interchanged with symbols. For example, one rule may not allow all of the previous markings from replacing the new symbols at the corresponding symbol positions. In another example, a player may select which of the two symbols to use between the new symbol and the marking. In other embodiments (shown in FIGS. 10 and 11), the new symbol may be combined with the marking symbol to form a multi-indicia symbol that includes properties of both symbols. As described above, multiple re-spins may be performed in some embodiments when triggering conditions for the one or more additional re-spins is met.

In FIGS. 10 and 11 embodiments are shown in the form of a game progression where symbols meeting a winning condition (or other triggering condition) are held and associated with a corresponding symbol position while new symbols are generated for the symbol positions (FIG. 10) or the game reels are re-spun (FIG. 11) to generate new symbols on a game grid. The previously held symbols are then merged with the new symbols to form multi-indicia symbols which can be used in a variety of ways to provide awards.

Referring to FIG. 10, a game screen 1000 shows reels 1091-1095 being spun to generate a first game outcome, which is shown on screen 1004. This first game outcome is evaluated for a winning condition (or other triggering event that generates a re-spinning of the reels 1091-1095) in screen 1006. Here, the symbol positions 1020 are shaded or otherwise indicated to show a winning symbol combination.

As shown in screen 1008, the symbols associated with this winning condition are marked or otherwise associated with their winning symbol positions 1020 as markings 1022 while the game reels 1091-1093 are re-spun for the winning symbol positions 1020. In some embodiments, individual reels are spun for the symbol positions 1020, while in other embodiments, new symbols are randomly selected for the symbol positions 1020 associated with the winning condition without spinning any reels. Regardless of which embodiment is implemented, new symbols 1030 are shown in the symbol positions 1020 associated with the winning condition from the first game outcome, as shown in screen 1010. These new symbols are then merged or combined with the symbols of the markings 1022 (the symbols used in the winning condition in the first game outcome) to form multi-indicia symbols 1035, as shown in screen 1012.

These multi-indicia symbols 1035 may be evaluated in a variety of manners. In one embodiment, each symbol of the multi-indicia symbol 1035 is evaluated as a separate symbol. Hence, for screen 1012, a five symbol heart pay may be awarded since each of the hearts in the first two multi-indicia symbols 1035 on reels 1091 and 1092 would be identified or counted as two heart symbols, and the heart from the multi-indicia symbol appearing in the middle location of reel 1093 would be identified or counted as a single heart. Although these symbols on the multi-indicia symbols 1035 may be shown to be individually identified and awarded a similar award to five single heart symbols, a game processor may simply recognize them as special symbol that is associated with a different entry in a coded paytable stored in the memory of the gaming device.

In other embodiments, the multi-indicia symbol may act as a multiplier, such as doubling the value of the three heart pay. Thus, if this embodiment was implemented in screen 1012, a player may be award a pay value of 4 times the value of a normal 3-symbol heart pay. This is because each of the double heart multi-indicia symbols would be considered a "2×" multiplier. Multiple multipliers received on a payline may be summed together or multiplied together. Alternatively, a multiplier may be randomly assigned to each multi-indicia symbol 1035 having a double symbol, where in some embodiments, only the highest multiplier would be used to modify a value of a winning symbol combination pay. Other variations in evaluation techniques are possible and considered within the scope of this concept.

As mentioned above, in some embodiments, subsequent re-spins may occur when predefined conditions are met. In the embodiment shown in FIG. 10, both symbols of the multi-symbol indicia 1035 may be shrunk or otherwise marked to the associated symbol location, and a new symbol may be generated in the symbol location by spinning the reels or otherwise randomly choosing another symbol. In these cases, a subsequent re-spin may generate 3-symbol multi-indicia symbols, or 4 or more multi-indicia symbols after subsequent re-spins. Note that in this embodiment, other symbols in the symbol positions are maintained when the symbols in the symbol locations associated with a winning condition are re-spun. Although not shown in FIG. 10, other embodiments, may cascade or otherwise shift the reels 1091-1095 or symbols of the reels down to replace the removed (and marked) symbols used in the winning condition of the first game outcome.

The embodiment shown in the game progression of FIG. 11 is similar to the one shown in FIG. 10, except the entire reels re-spin for a second game outcome instead of just the symbol positions used in a winning condition. In particular, a game screen 1100 shows reels 1191-1195 being spun to generate a first game outcome, which is shown on screen 1104. This first game outcome is evaluated for a winning condition (or other triggering event that generates a re-spinning of the reels 1191-1195) in screen 1106. Here, the symbol positions 1120 are shaded or otherwise indicated to show a winning symbol combination.

As shown in screen 1108, the symbols associated with this winning condition are marked or otherwise associated with their winning symbol positions 1120 as markings 1122 while the game reels 1191-1195 are re-spun. New symbols 1130 are shown in the symbol positions 1120 associated with the winning condition from the first game outcome, as shown in screen 1110. These new symbols are then merged or combined with the symbols of the markings 1122 (the symbols used in the winning condition in the first game outcome) to form multi-indicia symbols 1135, as shown in screen 1112. These multi-indicia symbols 1135 may be evaluated in a similar manner as described above. Thus, for screen 1112, a player may receive a 7-heart pay (bottom horizontal payline), a 5-heart pay (payline used in first game outcome), and a 3-diamond pay. Alternatively, if multi-indicia symbols 1135 can only be used once, the player would only receive a 7-heart pay and a 3-diamond pay.

The foregoing description of the exemplary embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A gaming device comprising:

a memory storing data related to a plurality of game reels;

a display device having a grid of symbols positions;

a player interface including at least one button, the button configured to generate a signal in response to being activated;

a wager input device structured to identify and validate cards, currency, or currency based tickets; and a processor operable to:

determine a first game outcome to display;

manipulate the plurality of gaming reels to display the first game outcome in the grid;

determine, based on the first game outcome, whether a winning condition that is entitled to a payout is present in the displayed first game outcome in the grid;

when a winning condition has been determined to be present:

identify a first subset of the plurality of gaming reels displayed in the grid as reels associated with the winning condition, identify a second subset of the plurality of gaming reels displayed in the grid as the remaining reels of the plurality of gaming reels not in the first subset of gaming reels, determine a second game outcome by maintaining a position of the first subset of gaming reels and selecting new outcomes to display in the grid for each of the second subset of gaming reels, and manipulate the second subset of gaming reels to display the second game outcome in the grid; and award any payouts based on the second game outcome.

2. The gaming device of claim 1, wherein the determination of a second game outcome and manipulation of the second subset of gaming reels to display the second game outcome in the grid is performed two or more times in response to the winning condition being satisfied.

3. A gaming device comprising:

a memory storing data related to a plurality of game reels;

a display device having a grid of symbols positions;

a player interface including at least one button, the button configured to generate a signal in response to being activated;

a wager input device structured to identify and validate cards, currency, or currency based tickets; and a processor operable to:

randomize, in response to a user input, a plurality of gaming reels so that the gaming reels are in a first configuration in the grid;

determine, based on the first configuration of the gaming reels, whether an arrangement of symbols on the gaming reels has formed a winning condition that meets a payout condition;

when a winning condition is determined to have occurred, identify a first subset of the gaming reels in the grid as reels having the symbols used in the formation of the winning condition, identify a second subset of the gaming reels as the remaining reels of the plurality of gaming reels not in the first subset of gaming reels, and randomize the second subset of gaming reels while maintaining the position of the first subset of reels so that the plurality of gaming reels are in a second configuration in the grid; and provide a final payout based at least on the second configuration of the plurality of gaming reels in response to the randomization of the second subset of gaming reels.

4. The gaming device of claim 3, wherein randomizing the second subset of the gaming reels comprises randomizing one or more of the second subset of the gaming reels two or more times in response to the winning condition being satisfied.

5. A gaming device comprising:

a memory storing data related to a plurality of game reels;

a display device having a grid of symbols positions;

a player interface including at least one button, the button configured to generate a signal in response to being activated;

a wager input device structured to identify and validate cards, currency, or currency based tickets; and a processor operable to:

randomize, in response to a user input, a plurality of gaming reels so that the gaming reels are in a first configuration on a gaming display having a game grid with a plurality of symbol positions;

determine, based on the first configuration of the gaming reels, whether an arrangement of symbols on the gaming reels has formed a winning condition on the game grid that meets a payout condition;

when a winning condition is determined to have occurred, identify a first subset of symbols from the gaming reels that are used in the formation of the winning condition, mark symbol positions in the grid associated with the first subset of symbols with indicia respectively reflecting the first subset of symbols, and randomize the gaming reels so that they are in a second configuration, where a second subset of symbols reside in the marked symbol positions;

identify symbol combinations using the first subset of symbol indicia and the second subset of symbols in the marked symbol positions; and provide a final payout based at least on an evaluation of the second configuration of the plurality of gaming reels and the identified symbol combinations.

6. The gaming device of claim 5, wherein each symbol not residing in a marked symbol position resulting from the first configuration is maintained when the gaming reels are randomized to be in the second configuration.

7. The gaming device of claim 5, wherein identifying symbol combinations using the first subset of symbol indicia and second subset of symbols in the marked symbol positions includes forming multi-indicia symbols having indicia showing both a symbol from the first subset of symbols and a symbol from the second subset of symbols in each marked symbol position.

8. The gaming device of claim 7, wherein the identified symbol combinations consider each symbol of the multi-indicia symbols as independent symbols.

9. The gaming device of claim 5, wherein identifying symbol combinations using the first subset of symbol indicia and second subset of symbols in the marked symbol positions includes determining which of a symbol from the first subset of symbols and a symbol from the second subset of symbols provides higher paying symbol combinations for each marked symbol position to identify an optimal symbol for each marked symbol position.

10. The gaming device of claim 9, wherein determining which of a symbol from the first subset of symbols and a symbol from the second subset of symbols provides higher paying symbol combinations for each marked symbol position includes identifying an optimal symbol for each marked symbol position for each of a plurality of played paylines.

11. The gaming device of claim 10, further comprising fixing the identified optimal symbol for the evaluation in the final payout for all played paylines.

12. The gaming device of claim 10, further comprising providing the identified optimal symbol for the evaluation in the final payout for each played payline of the plurality of played paylines.

13. A gaming apparatus comprising:

a plurality of gaming reels each having a plurality of symbols;

a game display including a game grid having a plurality of symbol positions, the game display configured to display symbols from each gaming reel in the symbol positions of the game grid in response to gaming events;

a controller coupled to the gaming reels, the controller configured to:

randomly determine a first game outcome including determining which symbols on each gaming reel to show on the game grid;

manipulate the plurality of gaming reels to display the first game outcome on the game grid;

determine, based on the first game outcome, whether a winning condition that is entitled to a payout is present on the game grid;

when a winning condition has been determined to be present on the game grid:

identifying a first subset of symbol positions as positions that include symbols that are part of the winning condition, identifying a second subset of symbol positions as the remaining symbol positions not in the first subset of symbol positions, determining a second game outcome by maintaining the symbols displayed in the first subset of symbol positions and randomly selecting which of the plurality of symbols to display in the second subset of symbol positions, and manipulating the gaming reels to display the second game outcome on the game grid; and a payout device configured to award any payouts based on the first game outcome and the second game outcome.

14. The gaming apparatus of claim 13, wherein the controller is further configured to:

determine based, on the second game outcome, whether a subsequent winning condition that is entitled to a payout is present on the game grid, where the subsequent winning condition is different than the previously determined winning condition in the first game outcome; and when a subsequent winning condition has been determined to be present on the game grid:

identifying a first subset of symbol positions as positions that include symbols that are part of the subsequent winning condition, identifying a second subset of symbol positions as the remaining symbol positions not in the first subset of symbol positions, determining a third game outcome by maintaining the symbols displayed in the first subset of symbol positions and randomly selecting which of the plurality of symbols to display in the second subset of symbol positions, and manipulating the gaming reels to display the second game outcome on the game grid.

15. The gaming apparatus of claim 14, wherein the subsequent winning condition is defined as a winning condition that is associated with an award larger than an award associated with than the previously determined winning condition in the first game outcome.

16. The gaming apparatus of claim 14, wherein the processes of determining if a subsequent winning condition for a current game outcome is present on a game grid, identifying a first subset of symbols, identifying a second subset of symbols, determining another game outcome, and manipulating the game reels to display the another game outcome are repeated until it is determined that a subsequent winning outcome is not present on the reels.

17. The gaming apparatus of claim 13, wherein the controller is further configured to:

determine based, on the second game outcome, whether a subsequent winning condition that is entitled to a payout is present on the game grid, where the subsequent winning condition is different than the previously determined winning condition in the first game outcome; and when a subsequent winning condition has been determined to be present on the game grid:

identifying a first subset of symbol positions as positions that include symbols that are part of both the subsequent winning condition and the previously determined winning condition in the first game outcome, identifying a second subset of symbol positions as the remaining symbol positions not in the first subset of symbol positions, determining a third game outcome by maintaining the symbols displayed in the first subset of symbol positions and randomly selecting which of the plurality of symbols to display in the second subset of symbol positions, and manipulating the gaming reels to display the second game outcome on the game grid.

18. The gaming apparatus of claim 17, wherein the subsequent winning condition is defined as a winning condition that is associated with an award larger than an award associated with than the previously determined winning condition in the first game outcome.

19. The gaming apparatus of claim 17, wherein the processes of determining if a subsequent winning condition for a current game outcome is present on a game grid, identifying a first subset of symbols, identifying a second subset of symbols, determining another game outcome, and manipulating the game reels to display the another game outcome are repeated until it is determined that a subsequent winning outcome is not present on the reels.

20. The gaming apparatus of claim 13, wherein determining whether a winning condition that is entitled to a payout is present on the grid includes determining all winning conditions entitled to a payout on the grid, and wherein identifying a first subset of symbol positions includes identifying all symbol positions used in all winning conditions.

* * * * *